No. 792,146. PATENTED JUNE 13, 1905.
T. M. MILLS & T. J. McKINNON.
NUT LOCK.
APPLICATION FILED OCT. 28, 1903.

Witnesses

Inventors
Thomas M. Mills
Thomas J. McKinnon
By Victor J. Evans
Attorney

No. 792,146. Patented June 13, 1905.

UNITED STATES PATENT OFFICE.

THOMAS M. MILLS AND THOMAS J. McKINNON, OF SAN ANTONIO, TEXAS.

NUT-LOCK.

SPECIFICATION forming part of Letters Patent No. 792,146, dated June 13, 1905.

Application filed October 28, 1903. Serial No. 178,860.

*To all whom it may concern:*

Be it known that we, THOMAS M. MILLS and THOMAS J. McKINNON, citizens of the United States, residing at San Antonio, in the county of Bexar and State of Texas, have invented new and useful Improvements in Nut-Locks, of which the following is a specification.

Our invention relates to improvements in nut-locks; and its object is to provide suitable means connected to the nut, whereby the same is permanently locked and prevented from removal unless by the breaking away of the nut from the bolt, or vice versa; and the invention consists in the construction and arrangement of parts, as will be hereinafter described, and particularly pointed out in the claim.

Figure 1:
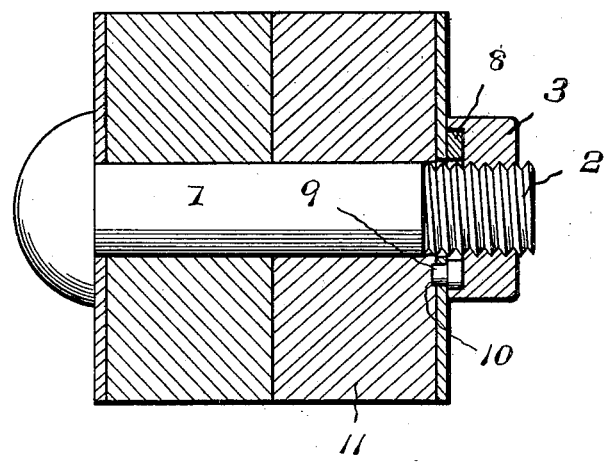
Figure 2:
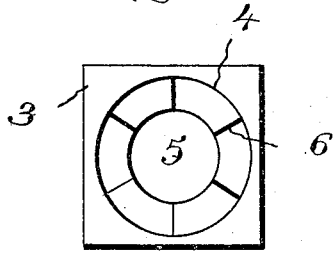
Figure 3:
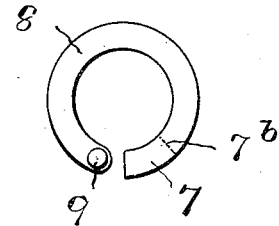
Figure 4:
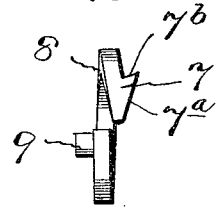

In the accompanying drawings, Figure 1 is a section through our improved nut-lock, the same being shown upon a bolt. Fig. 2 is an inner elevation of the nut, showing the inclination of the ratchet-teeth. Fig. 3 is a detail view of the washer. Fig. 4 is a side elevation thereof.

Referring to the figures of the drawings by numerals of reference, 1 is a bolt, having a threaded end 2, on which is mounted and adapted to rotate a nut 3. Within the inner face of this nut is formed a continuous circular recess 4, the outer wall of which is preferably concentric with the screw-threaded opening 5, arranged centrally in the nut. Within the inner wall of the recess 4 we provide ratchet-teeth 6, which are inclined on one portion thereof for a purpose presently to be explained.

The numeral 8 denotes a locking-washer made of steel and having split or spaced-apart ends. Said washer is mounted within the recess 4 of the nut and has on one of its ends a pin 9, which projects laterally therefrom and also projects beyond the inner face of the nut 3 when mounted in the recess 4 of the same. The opposite end of this washer is provided with an enlarged laterally-extended bent end on which is formed a tooth 7, having an inclined under surface $7^a$ and a shoulder $7^b$, the former of which is adapted to ride over the inclined surfaces of the ratchet-teeth, and the latter engages shoulders of said teeth of the same configuration as shoulder $7^b$ of the tooth 7, whereby to lock the nut on the bolt.

In using this device the pin 9 of the washer is placed in engagement with a suitable aperture formed in an object 11, in which the bolt 1 is placed, whereby to hold the washer during the rotation of the nut on the bolt. The bolt is then inserted through the washer, and the nut 3 is placed thereon and turned so as to bring the washer in position within the recess 4. As the rotation of the nut continues the incline of the tooth 7 rides over the inclines of the ratchet-teeth 6, and the shoulder of the tooth serves to engage similar shoulders on the teeth of the ratchet and prevents the nut from being unscrewed from the bolt. It will be seen that after the nut has once been tightened upon the bolt it cannot be removed. Moreover, the locking means is invisible and cannot be reached by any tools which may be employed for disengaging the parts.

Having thus described the invention, what is claimed as new is—

A bolt adapted for insertion through a body and having a threaded portion, a nut designed for engagement with the threaded portion of the bolt and having an annular recess formed in its normally inner face, a series of ratchet-teeth formed upon the inner side face of the nut within the recess and concentric with the bolt-receiving opening, and a locking-ring designed to seat and be housed wholly within the recess, said ring having upon one side face a tooth adapted for engagement with any one of the ratchet-teeth upon the nut and on its other side face an opposite lateral projection for engagement with the body to which the bolt is applied.

In testimony whereof we affix our signatures in presence of two witnesses.

THOMAS M. MILLS.
THOMAS J. McKINNON.

Witnesses:
WILLIAM A. GLASS,
ALONZO L. SIMMONS.